United States Patent
Kull et al.

(10) Patent No.: US 6,943,985 B2
(45) Date of Patent: Sep. 13, 2005

(54) SPINDLE MOTOR AND HARD DISK DRIVE

(75) Inventors: Andreas Kull, Donaueschingen (DE); Joerg Hoffman, Mettlach (DE); Olaf Winterhalter, Epfendorf (DE)

(73) Assignee: Minebea Co., Ltd., Nagano (JP)

( * ) Notice: Subject to any disclaimer, the term of this patent is extended or adjusted under 35 U.S.C. 154(b) by 22 days.

(21) Appl. No.: 10/384,012

(22) Filed: Mar. 7, 2003

(65) Prior Publication Data

US 2003/0174637 A1 Sep. 18, 2003

(30) Foreign Application Priority Data

Mar. 8, 2002 (DE) .......................................... 102 10 231

(51) Int. Cl.⁷ .............................................. G11B 17/02
(52) U.S. Cl. .................................................. 360/99.08
(58) Field of Search .......................... 360/99.08, 99.04, 360/98.07; 310/67 R, 90, 91; 384/100, 107, 120, 131, 132

(56) References Cited

U.S. PATENT DOCUMENTS

| 5,357,163 A | 10/1994 | Minakuchi et al. |
| 5,487,608 A * | 1/1996 | Leuthold et al. ............ 384/113 |
| 5,536,088 A | 7/1996 | Cheever et al. |
| 5,667,309 A | 9/1997 | Nose |
| 5,847,479 A | 12/1998 | Wang et al. |
| 5,973,878 A | 10/1999 | Yoshida et al. |
| 6,172,847 B1 | 1/2001 | Sakatani et al. |
| 6,217,218 B1 | 4/2001 | Inoue et al. |

FOREIGN PATENT DOCUMENTS

JP  2000-215589 A  8/2000

* cited by examiner

Primary Examiner—Robert S. Tupper
(74) Attorney, Agent, or Firm—Joel Lutzker; Anna Vishev; Schulte Roth & Zabel

(57) ABSTRACT

A spindle motor for a hard disk drive having a stationary component with a first bearing surface, and a rotating component with a second bearing surface located in opposing relationship with the first bearing surface. The first and the second bearing surfaces form a hydrodynamic bearing. A bearing gap is formed between the first bearing surface and the second bearing surface, the bearing gap being filled with lubricating fluid. An oil-free recess is provided in the motor for placement of electromagnetic components of the motor. The stationary component is provided with a first set of seal surfaces, and the rotating component is provided with a second set of seal surfaces. The seal surfaces of the first set are located opposite the seal surfaces of the second set and form a labyrinth seal sealing the bearing gap from the oil-free motor recess.

10 Claims, 3 Drawing Sheets

SPINDLE MOTOR AND HARD DISK DRIVE

CROSS REFERENCE TO RELATED APPLICATIONS

This application claims all rights of priority to German Patent Application Serial No. DE 102 10 231.7, filed Mar. 8, 2002 (pending).

BACKGROUND

The invention relates to a spindle motor and a hard disk drive.

A spindle motor for a hard disk drive generally comprises a rotating component, a rotor, having an annular permanent magnet and a stationary component, a stator, having a stator stack wound with the coils, wherein the rotor is equipped with an appropriate rotary bearing to support the rotor with respect to the stator.

Alongside rolling bearings which have been in use for a long period of time, hydrodynamic bearings are now finding increasing application. A hydrodynamic bearing is an improvement on a journal bearing and can include a bearing sleeve having a cylindrical inner bearing surface and a shaft having a cylindrical outer bearing surface, the shaft being set into the sleeve. The diameter of the shaft is only slightly smaller than the inside diameter of the sleeve, thus a radial bearing gap is created between the two bearing surfaces that is filled with a lubricant, preferably oil, forming a continuous capillary film.

Bearing oil can be prevented from escaping from the hydrodynamic bearing by providing one end face of the bearing sleeve with an airtight seal. At the opposite open end a tapered area can be formed between the shaft and the inner surface of the bearing. The tapered area accommodates expanded volume of the lubricant during operation and acts as a lubricant reservoir. This tapered area also takes on the function of sealing the bearing by means of a capillary tension phenomenon. Under the influence of capillary forces, the oil in the area between the shaft and the tapered opening of the bearing sleeve forms a stable, continuous liquid film. The described seal is often called a capillary seal.

The main factor limiting the lifespan of a spindle motor with a hydrodynamic bearing is decrease in quantity of lubricant over time because a part of the bearing oil transforms into a gaseous state as a result of vapor pressure. The vaporization rate is directly proportional to the temperature and inversely proportional to the pressure on the surfaces contacting the surrounding air.

With the loss of lubricant, the risk that the bearing surfaces come into contact with each other when the motor starts up and stops increases. This causes particles, which may be larger than the thickness of the bearing gap, to be rubbed off. This results in dry running and seizure of the bearing surfaces leading to blockage of the spindle motor.

In addition, the vaporized matter can end up being deposited, iner alia, on the data disks in the hard drive which could result in the "bonding" of the read/write head to the data carrier disks leading again to a total breakdown of the hard disk drive.

A capillary seal with a tapered area contributes to the vaporization process in that the bearing oil on the surfaces in contact with the air forms a meniscus and, with a relatively large surface at the beveled inside edge of the bearing sleeve, is exposed to the surrounding air.

SUMMARY

It is an object of the invention to provide a spindle motor for a hard disk drive that has a rotor with a hydrodynamic bearing arrangement, whose probability of breakdown due to the loss of bearing fluid is considerably reduced and whose lifespan is significantly increased.

In accordance with the present disclosure and claims, a spindle motor is provided wherein the rotating and the stationary components both have sealing surfaces located opposite from each other. Sealing surfaces do not come into contact with each other and form a labyrinth seal. In this construction, the volume of bearing fluid is protected from direct contact with the surrounding air and is thus protected against vaporization or evaporation.

Preferably, at least one of the seal surfaces is provided with a groove, particularly with a groove pattern or grooving. These grooves, or this groove pattern, is designed in such a way that, while the rotating component is turning, a pumping action is generated in the labyrinth seal due to the relative movement of the seal surfaces arranged in pairs and separated from each other. This pumping action builds up a small amount of excess pressure on the contact surface between air and fluid and prevents any air exchange due to air circulation.

The air in the area of contact between the air and bearing fluid can become more easily concentrated with vaporizing bearing fluid as a result of the provided construction. The outgasing rate is then greatly diminished, the loss of bearing oil is considerably reduced, and the lifespan of the hydrodynamic bearing is significantly increased.

Due to the relative rotary movement of the separated seal surfaces, air particles in the seal gap are subjected to an accelerating force whose directional components are influenced by the design of the grooves. As a result, the air is compressed and a "quasi-statistic" pressure layer is formed, increasing from the outside towards the inside and being concentric to the rotational axis.

This effect can be intensified by increasing the effective length of the grooves by giving them an arched or spiral shape and by steadily reducing groove width from the outside towards the inside in the direction of the rotational axis.

Another groove pattern can be provided preferably on the pair of seal surfaces at the outer diameter of the bearing sleeve. This grooving may be formed by several grooves of constant width located next to each other and arranged diagonally to the longitudinal direction of the bearing sleeve.

To increase the sealing effect of the labyrinth seal, which is directly proportional to the effective gap length and inversely proportional to the gap thickness, a further pair of seal surfaces can be provided on the face of a flange projection which serves to accommodate the bearing sleeve non-rotatably. This arrangement of paired seal surfaces, where one seal surface formed on the face of the projection cooperates with a corresponding seal surface formed on the hub, can either be used as an ancillary seal or exclusively. The flange enables the spindle motor to be easily mounted onto one of the hard disk drive's supporting plates.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
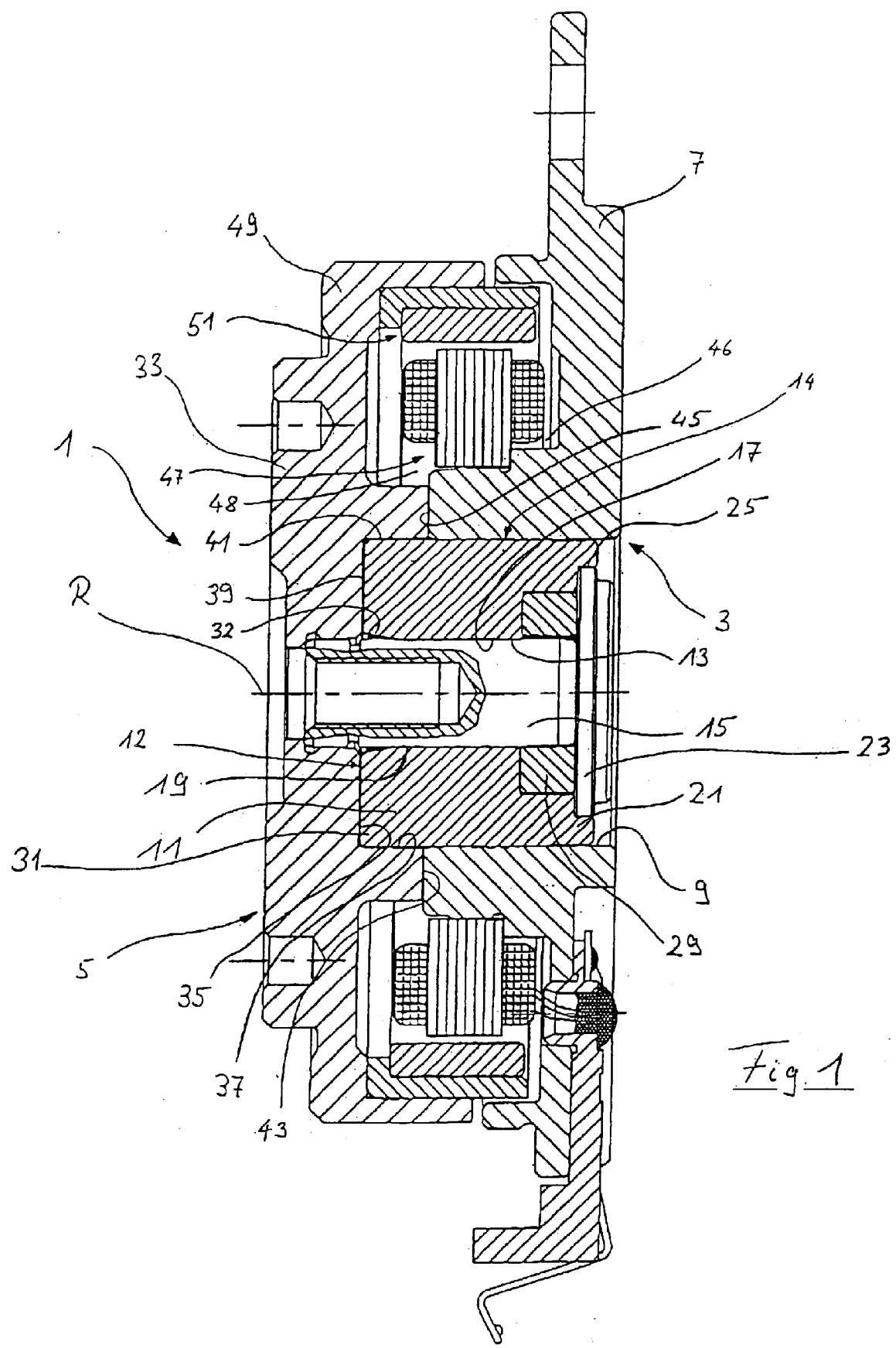
FIG. 1 is a cross-sectional view of a spindle motor in the preferred embodiment.

The spindle motor 1 shown in FIG. 1 includes a stator 3 and a rotor 5 which rotates around a rotational axis R. The stator 3 features a flange 7 that is fixed to a supporting plate, which is not illustrated. A bore 9 is provided in the center of the flange 7 into which a bearing sleeve 11 is fitted. A rotatable shaft 15 is placed into a bearing bore 13 of the bearing sleeve 11, wherein a gap is provided between the inner diameter 17 of the bearing sleeve 11 and a bearing surface 19 of the shaft 15 (the gap is not shown in detail in FIG. 1). To provide shaft 15 with a hydrodynamic bearing, a lubricant, preferably oil, is introduced into the bearing gap between the shaft and the bearing bore 13.

The bearing sleeve is sealed tightly at its bottom end 21 by a counter plate 23 which is set into a recess 25. A thrust washer 29 is non-rotatably connected to the end of the shaft 15 and is placed into another recess 27 stepped radially inwards from the recess 25. The counter plate 23 and the thrust washer 29 can be additionally secured by a generally known means such as bonding, screwing, welding or caulking.

At the top end 31 of the bearing sleeve 11, the inner diameter 17 of the bearing sleeve is lightly slanted so that a capillary seal 32 is created in the area thus enlarged between the shaft 15 and the bearing sleeve 11. The capillary seal can also act as a lubricant reservoir and a volume equalizer. When the area of the capillary seal is correctly dimensioned, the surface tension of the bearing oil ensures that under normal operating conditions no oil escapes from the bearing gap, even when subjected to an axial shock.

At the area of the shaft 15 adjoining the top 31 of the bearing sleeve 11, a hub 33 is fixed to the shaft 15. The side of the hub 33 adjoining the bearing sleeve 11 is adapted to the shape of the bearing sleeve 11 and features two seal surfaces 35, 37 perpendicular to each other. A cap-shaped seal surface 39 extends over the entire top face 12 of the bearing sleeve 11 and is at least partially adjacent to an outer diameter 41 of the bearing sleeve.

The hub 33 is non-rotatably fixed by means of a perfectly fitting bore to the free end of the shaft 15 protruding from the bearing sleeve 11 and opposing the thrust washer 29. A projection with a cylindrical recess is formed at the central area of the hub 33 to match the top end of the bearing sleeve in such a way that a part of the bearing sleeve extends into the cylindrical recess forming seal surfaces 35, 37 and 39.

Thus, a first pair of seal surfaces 35, 39 extend over the entire top face 12 of the bearing sleeve 11 whose stationary seal surface 39 cooperates with the seal surface 35 at the bottom of the hub recess. Another pair of seal surfaces 37, 39 is formed at the axial overlap area of the outer diameter 41 of the bearing sleeve and a vertical extension of surface 39.

Another seal is formed by a pair of seal surfaces 43, 45. Seal surface 45, at the bottom of the projection on the hub, extends radially outwards in a plane which is parallel and axially staggered with respect to seal surface 35. The opposing seal surface 43 is located on the end face of a projection on the flange in an area adjoining the bearing sleeve 11. An essentially equally dimensioned seal gap is formed between seal surfaces 43 and 45.

In this way, a stepped seal arrangement is created which is particularly suited to a labyrinth seal formed by individual seal gaps. The stepped seal gap bounded by the seal surfaces 35 to 45 is dimensioned in such a way that, when the rotor 5 is rotated around the rotational axis R, a sealing effect is produced which corresponds to that of a labyrinth seal.

A stator stack 47 provided with coils is set into an annular recess 46 in the flange concentrically to the rotational axis R. Stator stack 47 encloses the bearing sleeve 11. A rotor magnet 51 corresponding to the stator stack 47 is connected firmly to the hub 33 on the inner surface of a radial, external ring section.

Both the flange 7 and the hub 33 adjoin a recess 48 holding the electromotive drive unit. Seal surfaces 35 to 45 form the labyrinth seal which seals the bearing gap of the hydrodynamic bearing, bounded by the bearing surfaces 17, 19, to protect the oil-free recess 48.

Figure 2:
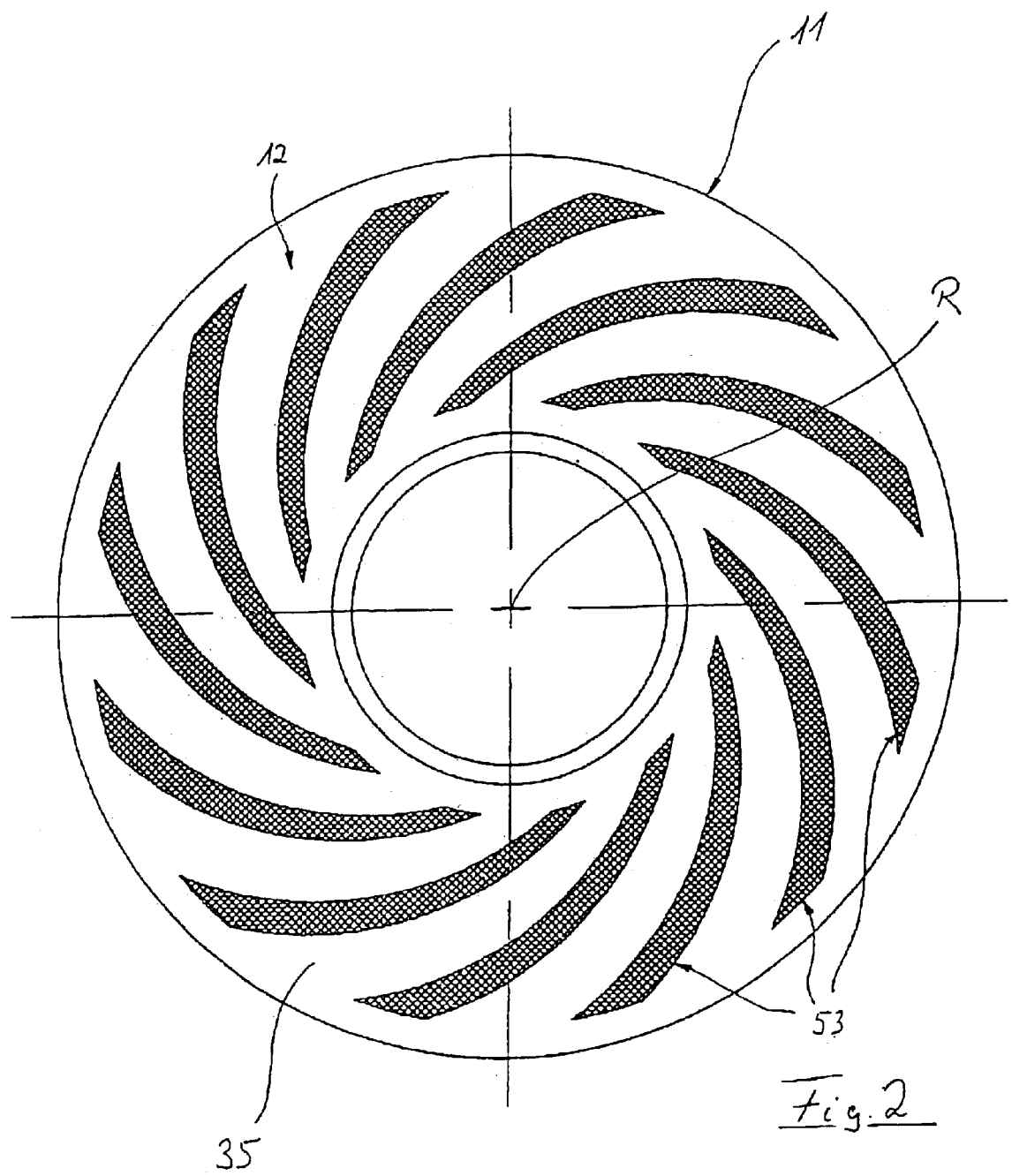
FIG. 2 is a top view of the bearing sleeve according to FIG. 1.

The seal surface 35 on the top face 12 of the bearing sleeve 11 is shown in more detail in FIG. 2. On the seal surface 35, a groove pattern consisting of several grooves 53 has been machined which essentially takes the form of a turbine blade arrangement. Grooves 53 are arched. Furthermore, grooves 53 are set at regular intervals with respect to each other and have their width increasing radially towards an outer circumference of the sleeve. This groove pattern ensures that an excess pressure, in relation to atmospheric pressure, is built up in the area of the capillary seal 32, and an exchange of air at the bearing surfaces of the capillary seal 32 is prevented to the greatest extent. In this way, the phenomenon of bearing oil vaporization which limits the spindle motor's lifespan is largely prevented.

Figure 3:
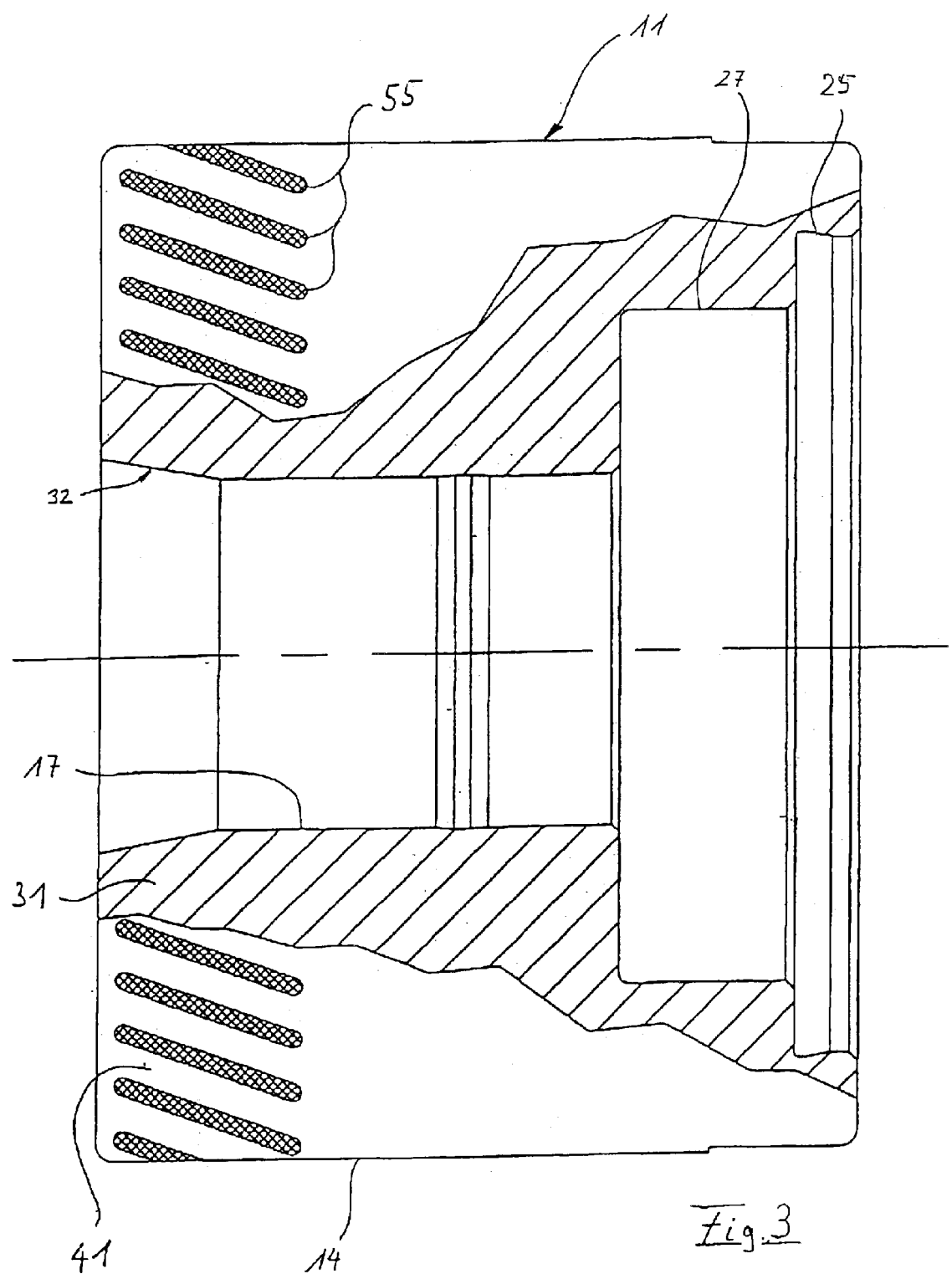
FIG. 3 is a side view of a partially exposed bearing sleeve.

As shown in cross-section of FIG. 3, the outer surface 41 of the bearing sleeve 11 is provided with an additional groove pattern consisting of several grooves 55 extended over at least a part of the surface 41. Grooves 55 are preferably straight with a constant width and set at constant intervals from each other. In order to support the build up of air pressure in the area of the capillary seal of the hydrodynamic bearing, grooves 55 are set diagonally to the longitudinal direction of the bearing sleeve.

On the seal surface 45 (see FIG. 1) of the flange 7, a groove pattern according to that shown in FIG. 2 can be provided. The individual groove patterns can of course be provided on all of the seal surfaces 35 to 45.

The characteristics disclosed in the above description, the figures and the claims, may be of importance individually and in any combination whatsoever of the realization of the invention. For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

We claim:

1. A spindle motor for use in a hard disk drive comprising:
a stationary component having a first bearing surface
   a rotating component having a second bearing surface located in opposing relationship with said first bearing surface, said first and said second bearing surfaces forming a hydrodynamic bearing;
   a bearing gap formed between said first bearing surface and said second bearing surface, said bearing gap being filled with lubricating fluid; and
   an oil-free motor recess,
   wherein said stationary component further comprises seal surfaces, wherein said rotating component further comprises seal surfaces, wherein said seal surfaces of said stationary component are located opposite the seal surfaces of said rotating component, wherein said seal surfaces of said stationary component and said rotating component form a labyrinth seal sealing said bearing gap from said oil-free motor recess, and wherein at least one of said seal surfaces of the stationary component or the rotating component is provided with a groove pattern.

2. The spindle motor according to claim 1, wherein said rotating component further comprises a shaft and a hub fixedly mounted on the shaft, said hub further comprising at least one of said seal surfaces of said rotating component, wherein said stationary component further comprises a bearing sleeve having at least one of said seal surfaces of said stationary component, and wherein said seal surfaces of said hub and said bearing sleeve are located opposite from each other to form said labyrinth seal.

3. The spindle motor according to claim 1, wherein at least one of said seal surfaces of said stationary component and at least one of seal surfaces of said rotating component adjoin said bearing surfaces.

4. The spindle motor according to claim 2, wherein said at least one of said seal surfaces of said stationary component is formed on at least part of an outer diameter of said bearing sleeve.

5. The spindle motor according to claim 1, wherein said stationary component further comprises a bearing sleeve and a flange attached to said bearing sleeve, wherein said flange comprises a seal surface of said stationary component adjoining said bearing sleeve, and wherein said rotating component further comprises a hub having a seal surface of said rotating component located opposite from said seal surface of said flange to form said labyrinth seal.

6. The spindle motor according to claim 1, wherein said groove pattern is configured to build up an excess air pressure increasing along seal surfaces of the stationary component and rotating component in the direction of said bearing surfaces.

7. The spindle motor according to claim 1, wherein said groove pattern is in the form of a turbine blade arrangement.

8. The spindle motor according to claim 7, wherein grooves of said groove pattern are curved and wherein the width of the grooves decreases radially inwards.

9. The spindle motor according to claim 1, wherein said groove pattern comprises straight, parallel grooves set diagonally to the longitudinal direction of the bearing sleeve on at least one of said seal surfaces of said stationary component or said rotating component.

10. A disk drive with a spindle motor having a spindle motor, said spindle motor comprising:
   a stationary component having a first bearing surface
   a rotating component having a second bearing surface located in opposing relationship with said first bearing surface, said first and said second bearing surfaces forming a hydrodynamic bearing;
   a bearing gap formed between said first bearing surface and said second bearing surface, said bearing gap being filled with lubricating fluid; and
   an oil-free motor recess,
   wherein said stationary component further comprises seal surfaces, wherein said rotating component further comprises seal surfaces, wherein said seal surfaces of said stationary component are located opposite the seal surfaces of said rotating component, wherein said seal surfaces of said stationary component and said rotating component form a labyrinth seal sealing said bearing gap from said oil-free motor recess, and wherein at least one of said seal surfaces of the stationary component or the rotating component is provided with a groove pattern.

* * * * *